Oct. 25, 1960        M. P. MARZILI        2,957,505
SWINGING SAW HAVING A READILY POSITIONABLE MOUNT
Filed July 19, 1955        2 Sheets-Sheet 1
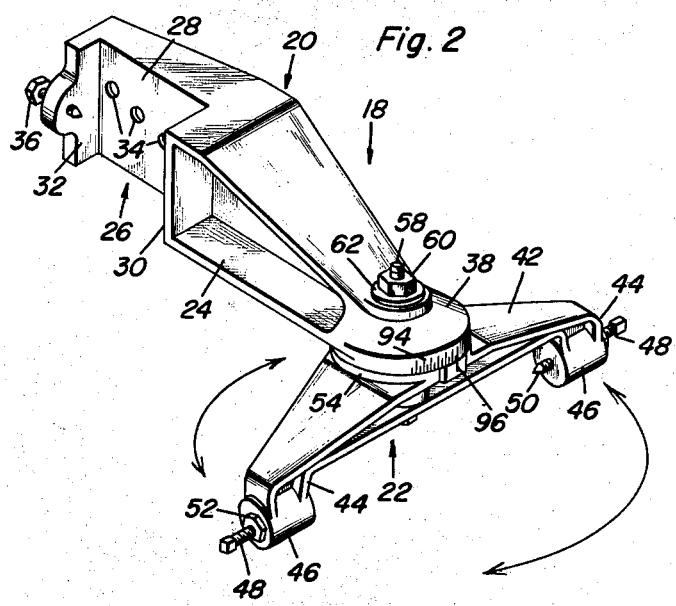
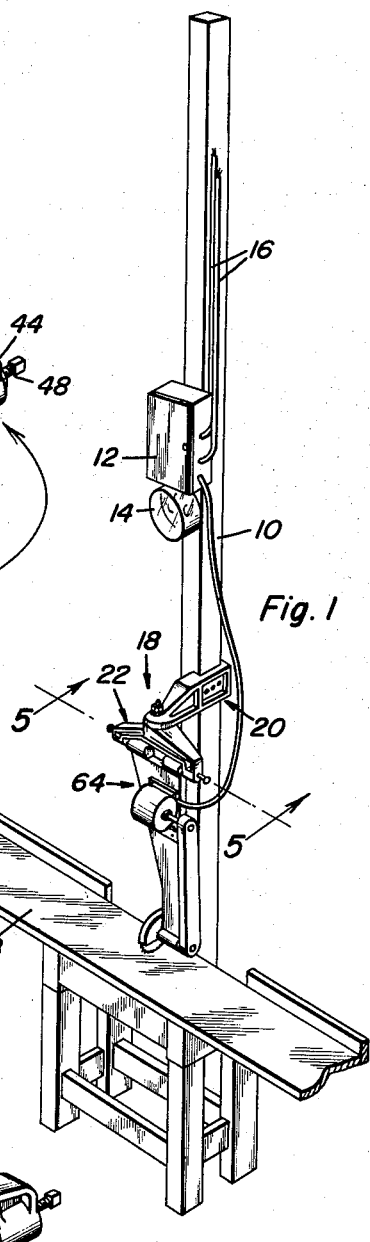
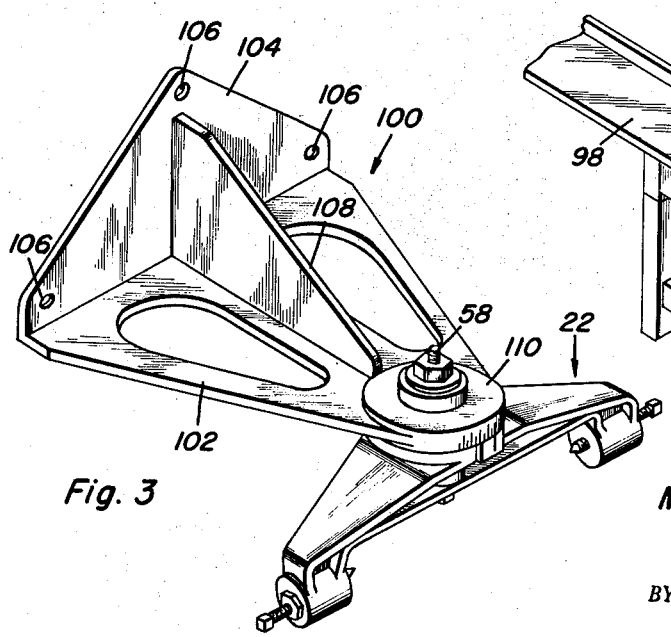
Mario P. Marzili
INVENTOR.

Oct. 25, 1960  M. P. MARZILI  2,957,505
SWINGING SAW HAVING A READILY POSITIONABLE MOUNT
Filed July 19, 1955  2 Sheets-Sheet 2
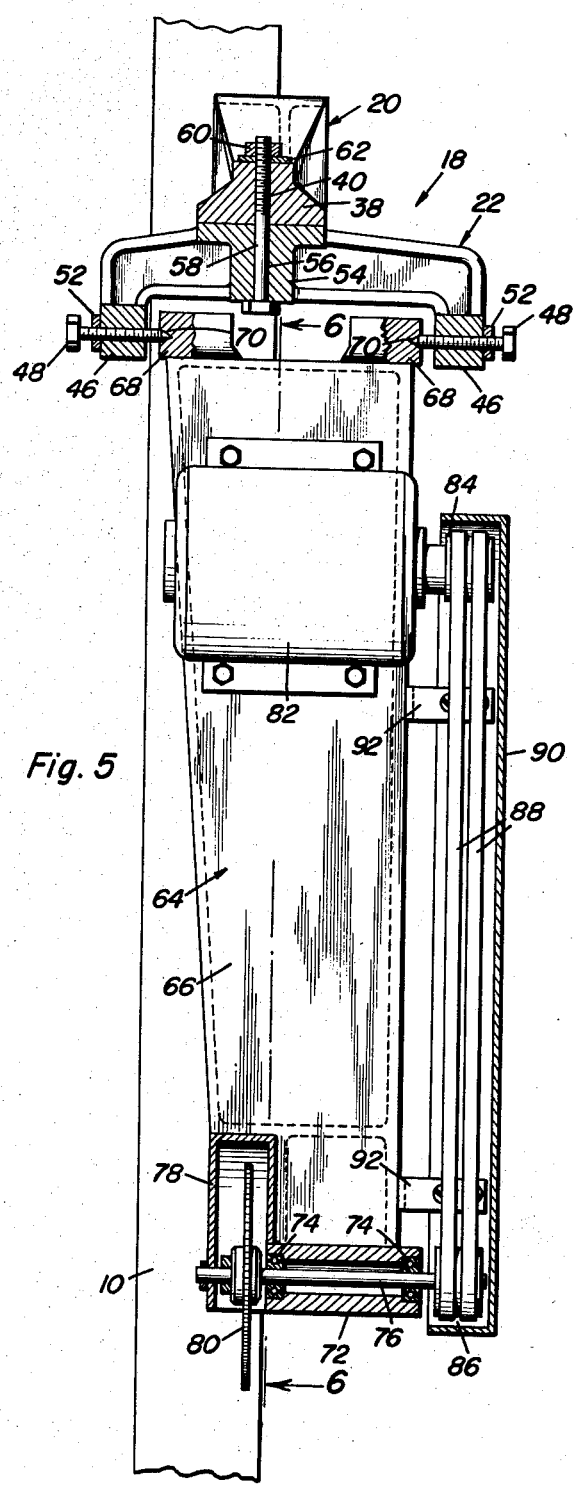
Fig. 5
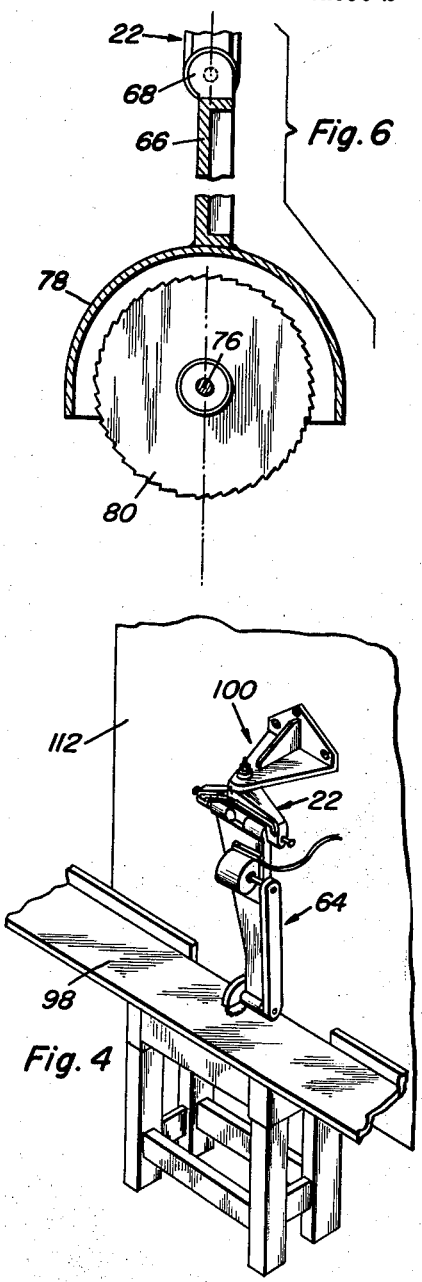
Fig. 6
Fig. 4
Mario P. Marzili
INVENTOR.
BY
Attorneys

United States Patent Office 2,957,505
Patented Oct. 25, 1960

2,957,505

SWINGING SAW HAVING A READILY POSITIONABLE MOUNT

Mario P. Marzili, Fort Lauderdale, Fla. (% Cut Cost Manufacturing Corp., Black Horse Pike, Rte. 3, Williamstown, N.J.)

Filed July 19, 1955, Ser. No. 523,027

2 Claims. (Cl. 143—46)

This invention relates in general to new and useful improvements in woodworking equipment, and more specifically to an improved swinging saw.

On a construction job, as soon as electricity has been brought into the particular buildings, there is normally brought in a swinging saw. However, such a saw is a relatively expensive type and is heavy so as not to be easily transportable. This, therefore, requires a special building in which the saw may be stored to prevent theft or damage. The preparation of such a building is not only expensive, but also time consuming.

It is therefore the primary object of this invention to provide an improved swinging saw of the type wherein the major component of the saw is detachable from its support and may be readily transported in the back of one's car, a truck or the like.

Another object of this invention is to provide an improved saw of the swinging type which includes a support which is so constructed whereby it may be readily attached to an electrical pole so that the saw may be immediately set up adjacent the electrical pole for the initial step of lumber cutting in a building construction.

Another object of this invention is to provide an improved swinging saw of the type which includes a universal support arm, the arm being of such construction whereby it may be readily secured to any part of a building for the purpose of supporting the swinging saw in an operative position.

A further object of this invention is to provide an improved saw of the swinging type, the saw including a support arm which has carried thereby on a vertical pivot a support bracket, the support bracket having carried thereby on a horizontal pivot the saw proper, the horizontal pivot and the vertical pivot intersecting and the vertical pivot having the axis thereof aligned with the center of the saw blade of the saw proper whereby the saw may be selectively rotated and swung in a cutting operation and the center of the saw will remain aligned with a center point on a work support at all times, thereby permitting the correct position of lumber to be sawed in respect to the angle of the cut.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the swinging saw, which is the subject of this invention, and shows the same mounted on an electric pole and being utilized in conjunction with a table-like work support;

Figure 2 is an enlarged perspective view slightly rotated of the support for the saw illustrated in Figure 1 and shows the other details thereof;

Figure 3 is an enlarged perspective view of a modified form of support for the saw and shows the details thereof;

Figure 4 is a perspective view showing the saw utilizing the support of Figure 3 for supporting a saw from the wall;

Figure 5 is an enlarged fragmentary vertical sectional view taken substantially upon the plane indicated by the section line 5—5 of Figure 1 and shows the specific details of the saw and the relation of the saw blade with respect to the support arm and support bracket carrying the frame for the saw; and Figure 6 is an enlarged fragmentary vertical sectional view taken substantially upon the plane indicated by the section line 6—6 of Figure 5 and shows the relationship of the center of the saw with respect to the horizontal pivot connecting the saw frame to the support bracket, an intermediate portion of the saw frame being broken away.

Referring now to the drawings in detail, it will be seen that there is illustrated the saw, which is the subject of the invention, the saw being mounted on an electric pole 10 in Fig. 1. The electric pole 10 is installed as one of the first steps in a building construction and is preferably in the form of a four-by-four or like timber. Mounted on the electric pole 10 is an electrical outlet box 12 and meter 14. Suitable lead-in wires 16 are connected to the meter 14 and the outlet box 12.

In order that the swinging saw may be mounted on the electric pole 10 there is provided a support which is refererd to in general by the reference numeral 18. As is best illustrated in Figure 2, the support 18 includes a support arm, which is referred to in general by the reference numeral 20, and a support bracket, which is referred to in general by the reference numeral 22.

The support arm 20 is preferably in the form of an elongated casting 24 which is of a modified I-shaped cross section. At one end of the casting 24 there is formed a clamp which is referred to in general by the reference numeral 26. The clamp 26 includes a longitudinal web 28, a forward flange 30 and a rear flange 32. The web 28 is provided with a series of openings 34 to permit the passage of fasteners for securing the casting 24 vertically with respect to the electric pole 10. The flange 32 is also provided with a clamping screw 36 which may be utilized to clamp the electric pole 10, or other support, against the flange 30. If desired, the forward end of the clamping screw 36 may be provided with an enlarged head (not shown).

The casting 24 is provided at the ends thereof remote from the clamp 26 with a hub 38. The hub 38 is generally horizontally disposed and includes a vertical bore 40, as is best illustrated in Figure 5.

The support bracket 22 is of an inverted U-shape and includes a cross bar 42 and depending legs 44. The legs terminate at their ends in horizontally disposed sleeves 46 which are internally threaded. Extending through the sleeves 46 are aligned pivot pins 48 which terminate in opposed conical support surfaces 50. The pivot pins 48 are retained in adjusted position with respect to their individual sleeves 46 by locking nuts 52.

The cross arm 42 includes a central hub or portion 54 which is aligned with the hub 38 and underlies the same. The hub portion 54 is provided with a central vertical bore 56 which is aligned with the bore 40. Extending upwardly through the hub portion 54 and the hub 38 is a vertical pivot pin or bolt 58. The upper end of the bolt 58 is provided with a removable nut 60 which overlies a washer 62.

Suspended from the support 18 is the swing saw proper, the swing saw being referred to in general by the reference numeral 64. The swing saw 64 includes an elongated saw frame 66 which is of resilient channel-shaped cross section. The upper end of the saw frame 66 terminates in a pair of transversely spaced, circular cross section mounting lugs 68. The mounting lugs 68 are provided at their remote ends with generally conical seats 70. The seats 70 receive the conical support surfaces 50 and permit the rotation of the lugs 68 with respect to the pivot pins 48 whereby the saw frame 66 may be swung as desired.

The lower end of the saw frame 66 terminates in a sleeve 72. The sleeve 72 is provided at opposite ends thereof with bearings 74 in which there is journalled a transversely extending shaft 76. The shaft 76 has one end thereof extending beyond an edge of the saw frame 66 while the other end thereof is disposed within a guard 78. The guard 78 is preferably cast as a part of the saw frame 66 and may be secured thereto by welding or by detachable fasteners, if desired. Mounted on that portion of the shaft 76 within the guard 78 is a circular saw blade 80.

In order that the circular saw blade 80 may be driven, there is mounted on the upper part of the saw frame 66 an electric motor 82. The electric motor 82 is provided with a double pulley 84 which is aligned with a double pulley 86 on the end of the shaft 76 remote from the saw blade 80. Entrained over the pulleys 84 and 86 and connected together in driving relation is a pair of drive belts 88. Encasing the drive belts 88 is a suitable guard 90 which is connected to the saw frame 66 by means of brackets 92.

It is pointed out at this time and as best illustrated in Figure 5, that the center of the saw blade 80 is aligned with the axis of the pivot pin 58. Further, the axes of the pivot pins 58 and 48 intersect. Thus irrespective of the particular angle the saw blade 80 is set with respect to lumber being cut, the center thereof remains in direct alignment with the axis of the pivot pin 58 and all cuts made by the saw blade 84 will have a common center. Therefore, lumber to be cut may be readily positioned with respect to the saw blade 80 for accurate cutting irrespective of the angle of the cut.

In order that the saw blade 80 may be set at a predetermined angle, there is provided on the hub 38 a scale 94. A pointer 96 is formed of a hub portion 54 for use in conjunction with the scale 94.

In the use of the swing saw 64, such as illustrated in Figure 1, there is provided a suitable work support in the form of a table 98. This table 98 may be provided with any type of guide desired in order that boards to be cut may be properly positioned with respect to the saw blade 80. It is recognized that the table 98 will not be perfectly aligned with the axes of the pivot pins 48. However, a right angle position of the saw blade 80 may be determined with respect to lumber guided on the table 98. In using the reading of the scale 94 for this particular position, desired angles may be cut by further using the scale 94.

With further reference to Figure 1, it is pointed out that one of the primary advantages of the present invention is that as soon as the electric pole 10 has been positioned and electricity has been provided, the electric saw, which is the subject of this invention, may be immediately set up without further preparations. This requires only the provision of the table 98, which may be formed of relatively cheap but durable lumber, and the saw itself. Of these components, only the support arm 20 need be permanently fixed on the electric pole 10. If desired, both the swing saw 64 and the support bracket 22 may be removed by removing the nut 60. On the other hand, if it is desired to only move the swing saw 64, one of the adjustable pivot pins 48 may be backed off and the swing saw 64 removed. The swing saw 64 may therefore be taken home at night time and will not require a special building be made for storage purposes. This in itself will result in a great saving on each job of both time and material.

Inasmuch as the electric pole 10 will be placed a distance from the actual building, after the initial phases of the building construction have been completed, it will be desired that the saw be moved into or immediately adjacent the building. Accordingly, there is provided a modified form of support arm which is referred to in general by the reference numeral 100, Figs. 3 and 4. The support arm includes a normal horizontal plate portion 102 which has extending upwardly from the rear thereof a mounting flange 104. The mounting flange 104 is provided with suitable openings 106 for receiving bolts, screws or other fasteners whereby the mounting flange 104 may be secured in place. The mounting flange 104 is braced with respect to the plate 102 by a gusset 108. The forward end of the plate 102 terminates in a hub 110. This hub 110 is very similar to the hub 38 and receives the pivot pin 58 so that the support bracket 22 may be pivotally secured thereto in the same manner as it is pivotally connected to the support arm 20.

Referring now to Figure 4 in particular, it will be seen that the support arm 100 is being utilized to support the saw 64 from a wall 112 of the building being built. The table 98 has now been moved indoors and is continued to be used.

Not only is the saw 64 usable in conjunction with the support arms 20 and 100, it may also be removed from the support bracket 22 and held in one's hand for performing certain sawing operations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A swing saw assembly comprising a support arm adapted to be mounted on a vertical support pole in adjusted vertically spaced relation above a work support, a support bracket, means pivotally mounting said support bracket to an end portion of said support arm for movement about a vertical axis fixed relative to said support arm, an elongated saw frame depending from said support bracket, means pivotally mounting the upper end of said saw frame to said bracket for movement about a horizontal axis intersecting the axis of rotation of said bracket whereby said saw frame may be swung in an upstanding plane, a saw blade, means journaling said saw blade for rotation about a horizontal axis extending transversely of the lower end of said saw frame, said saw blade having a center and lying in a plane containing said fixed axis whereby the center of said saw blade will be aligned with said fixed axis when said saw frame is swung to a depending vertical position, said first mentioned pivotal mounting means including means for releasably maintaining said support bracket in adjusted rotated positions, and drive means carried by said saw frame drivingly connected to said saw blade.

2. The combination of claim 1 wherein said support bracket includes spaced, aligned and oppositely opening sockets, said second mentioned pivotal mounting means comprising spaced and opposed pivot pins carried by the upper end of said saw frame and mounted for adjustable movement toward and away from each other and rotatably seated in said sockets whereby said saw frame, drive means and saw blade may be readily removed from said support arm as a single unit upon movement of said opposed pivot pins away from each other.

References Cited in the file of this patent

UNITED STATES PATENTS

| | | |
|---|---|---|
| 419,379 | Talbot | Jan. 14, 1890 |
| 775,504 | Stanton | Nov. 22, 1904 |
| 976,902 | Newton | Nov. 29, 1910 |
| 1,795,709 | Carter et al. | Mar. 10, 1931 |

FOREIGN PATENTS

| | | |
|---|---|---|
| 40,221 | Switzerland | July 13, 1907 |
| 230,158 | Germany | Jan. 14, 1911 |